Figure 1:
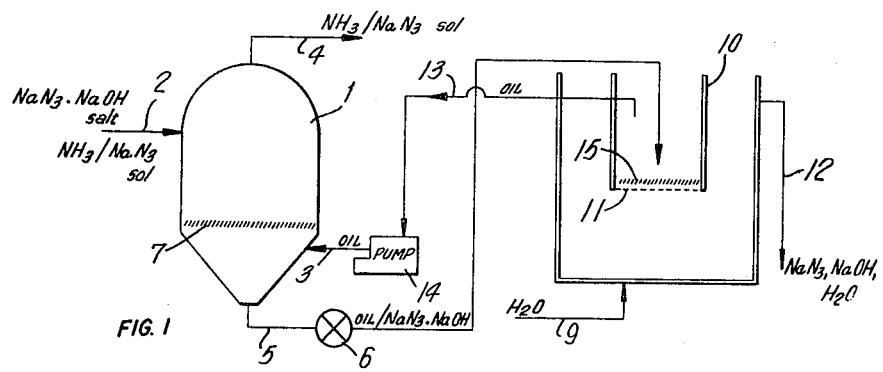

United States Patent [19]

Astrauskas et al.

[11] 3,953,582

[45] Apr. 27, 1976

[54] PROCESS FOR THE SEPARATION OF SODIUM AZIDE

[75] Inventors: Peter John Astrauskas, Montreal; Guy Michel Blondin, Beloeil; Roland Picard; Carl Fredrik Rigg, both of McMasterville, all of Canada

[73] Assignee: Canadian Industries, Ltd., Montreal, Canada

[22] Filed: Mar. 21, 1975

[21] Appl. No.: 560,732

[30] Foreign Application Priority Data
Apr. 24, 1974 Canada ............................... 198458

[52] U.S. Cl. ................................. 423/410; 23/299; 23/302 T
[51] Int. Cl.² ........................................ C01B 21/08
[58] Field of Search ............ 423/410; 23/299, 302

[56] References Cited
UNITED STATES PATENTS
2,994,583   8/1961   Levering ............................ 423/410

FOREIGN PATENTS OR APPLICATIONS
619,017   9/1935   Germany ........................... 423/410

OTHER PUBLICATIONS

"Chemical Abstracts," Vol. 54, 1960, p. 8412.

Audrieth, "Chemical Reviews," Vol. 15, 1934, pp. 198–204.

*Primary Examiner*—G. O. Peters
*Attorney, Agent, or Firm*—Donald G. Ballantyne

[57]   ABSTRACT

A process is provided for the continuous separation of suspended basic alkali metal azide particles from a liquid reaction medium by bringing the liquid reaction medium into contact with a non-reactive mineral oil whereby the suspended metal azide particles migrate into the mineral oil phase and are thereafter separated therefrom.

5 Claims, 2 Drawing Figures

PROCESS FOR THE SEPARATION OF SODIUM AZIDE

This invention relates to the manufacture of alkali metal azides and in particular to a process for the recovery of alkali metal azide from a reaction medium comprising an anhydrous ammonia/azide solution.

In the process for the manufacture of alkali metal azide described by Kawakami et al. in Japanese patent application No. 38-25353 (1963) published Nov. 28, 1963, an alkali metal, for example sodium is dissolved in liquid anhydrous ammonia at 50°C. and 300 psig and reacts therewith to form sodium amide. The sodium amide is then reacted with nitrous oxide to form a sodium azide/sodium hydroxide double salt. These reactions proceed according to the following empirical formulae:

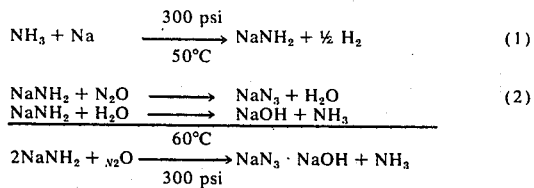

The product of the reaction described by Kawakami et al. and shown by formula (2) consists of a solution/suspension of an insoluble sodium azide/sodium hydroxide double salt suspended in the liquid ammonia/azide solution. The suspended insoluble double salt is recovered only with difficulty by filtration or centrifuging and the liquid ammonia/sodium azide solution is returned to the process at the stage represented by formula (1). The recovered double salt is dissolved in water and further processed to separate and recover sodium azide and sodium hydroxide.

The utility and hence the commercial applicability of the continuous process of Kawakami et al. is limited by the difficulty involved in the recovery of the basic alkali metal azide (the double salt) from the liquid ammonia carrier. Typically, solids suspended in liquids can be recovered by continuous centrifuging. However, centrifuges capable of operation at pressures in excess of about 150 psi are unknown. Pressure leaf filters can be employed but equipment costs and operating costs are high and such a system is not continuous. Kawakami et al. note that filtration methods are far from satisfactory. Evaporation of the ammonia to recover the double salt can likewise involve the erection of costly equipment and operation is expensive.

It is the object of the present invention to provide an improved method for the separation of solid particles of basic alkali metal azide from the reaction medium in a continuous azide manufacturing process. A particular object of the invention is to provide a method for the continuous and economic separation of suspended basic alkali metal azide particles from a liquid ammonia/alkali metal azide carrier solution.

The improved method of the invention for the separation of suspended solid particles of basic alkali metal azide from a liquid ammonia/alkali metal azide solution comprises the steps of (1) bringing the said solution containing suspended basic azide particles into contact with an immiscible mineral oil of density greater than the density of the said solution, (2) allowing the said mineral oil phase and said solution phase to settle to form an interface, (3) allowing the solid suspended basic azide particles to traverse the said interface and enter into suspension in the said mineral oil phase, and (4) separating the said solution phase and the basic azide-containing mineral oil phase and (5) recovering from the oil phase the said basic azide particles.

The improved method of the invention also comprises the additional steps of bringing the said basic azide-containing oil phase into contact with an aqueous phase to form an interface and allowing solid, suspended basic azide particles to traverse the said interface, preferably pass through a screening means at the said interface and enter into the said aqueous phase where the said basic azide particles are dissolved.

Thus there may be provided a three-layer system consisting of an upper phase of solid particles of basic alkali metal azide suspended in a liquid ammonia/alkali metal azide solution, a mid-layer comprising a mineral oil phase having a density greater than that of the upper layer and a lower layer comprising water, a screen being interposed at the oil phase/water phase interface. The screen mesh size is selected to correspond to the mean particle size of the basic alkali metal azide and minimizes carry over of oil with the basic azide particles as they settle into the aqueous phase.

Figure 2:
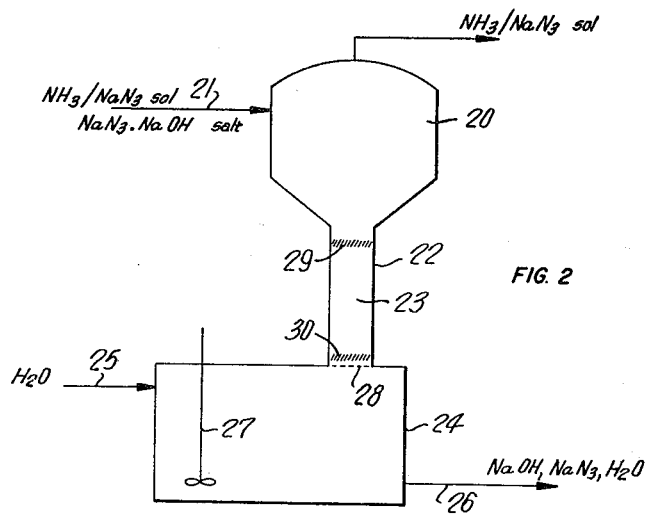

The method and apparatus of the invention may be better understood from an examination of the accompanying drawings wherein:

FIG. 1 shows a two-layer separation system wherein two separate two-layer separation methods are operated in tandem, and FIG. 2 shows a three-layer separation system.

Referring to FIG. 1 there is shown a closed pressure vessel 1 having an inlet line 2 for the introduction of a liquid ammonia/alkali metal azide solution containing suspended particles of basic alkali metal azide. Inlet line 3 is provided for the introduction into vessel 1 of an inert, immiscible mineral oil of a density greater than that of the liquid ammonia/alkali metal azide solution. Outlet line 4 provides for the removal of alkali metal azide dissolved in liquid ammonia and outlet line 5 is provided for the removal of mineral oil containing suspended particles of basic alkali metal azide. A letdown valve 6 is shown in line 5. The interface between the liquid ammonia/azide solution phase and the oil phase is shown at 7. Also shown is atmospheric vessel 8 having an inlet line 9 for the introduction of water. Within vessel 8 is vessel 10 having a bottom screen opening 11. Outlet line 12 is provided for the removal of an aqueous solution of alkali metal azide and alkali metal hydroxide. Line 13 provides an exit for mineral oil from vessel 10 which is returned by pump 14 to vessel 1. The interface between the oil phase and the aqueous phase is shown at 15.

Referring to FIG. 2, there is shown a closed pressure vessel 20 having an inlet line 21 for the introduction of a liquid ammonia/alkali metal azide solution containing suspended particles of basic alkali metal azide. The mid-section 22 of vessel 20 is of reduced cross-sectional size and contains an inert mineral oil phase 23 of density greater than that of the liquid ammonia/alkali metal azide solution. Enlarged lower section 24 of vessel 20 is shown with an inlet line 25 for the introduction of water, an outlet line 26 for the removal of aqueous solution of alkali metal azide and alkali metal hydroxide, and agitation means 27. A screen 28 is fitted between vessel sections 22 and 24. Liquid interfaces are shown at 29 and 30.

In an operation employing the apparatus of FIG. 1, a liquid ammonia/alkali metal azide solution containing suspended particles of basic alkali metal azide produced, for example, by the process described by Kawakami et al., is continuously delivered to pressure vessel 1 through inlet line 2. An inert mineral oil having a density greater than the density of the liquid ammonia/alkali metal azide solution is also continuously delivered into vessel 1 through line 30. The two solutions which are immiscible, form an interface at 7 and the suspended particles of basic alkali metal azide settle by gravity into the lower oil phase. The remaining upper solution in vessel 1 which comprises a substantially hydroxide-free solution of azide in liquid ammonia is continuously removed through line 4. The lower oil phase containing basic alkali metal azide particles is continuously removed at line 5 and passes through let-down valve 6 from whence it is delivered to atmospheric vessels 8 and 10 for further separation. Atmospheric vessel 8 is continuously supplied with water through line 9. The oil phase from vessel 1 passing through line 5 is delivered to screen-bottom vessel 10 where it forms an interface 15 with the water within vessel 8. Suspended particles of basic alkali metal azide settle by gravity onto screen 11 and pass into solution in the lower aqueous phase. Oil, relieved of its suspended basic azide particles, floats upward in the oil phase and is continuously returned to vessel 1 via line 13, pump 14 and line 3. The aqueous solution of basic alkali metal azide is continuously removed from vessel 8 through line 12 for further processing.

In an operation employing the apparatus of FIG. 2, a liquid ammonia/alkali metal azide solution containing suspended particles of basic alkali metal azide is continuously delivered into pressure vessel 20 through inlet line 21 where it forms an interface at 29 with an inert immiscible oil phase 23 in vessel section 22. Suspended particles of basic alkali metal azide settle into the oil phase 23. Water is continuously supplied to vessel section 24 through inlet line 25 where it forms an interface at 30 with oil phase 23. Suspended particles of basic alkali metal azide settle through oil phase 23 and are deposited on screen 28 where they are dissolved into the lower water phase. Dissolution of the basic azide particles is aided by agitation means 27. The aqueous solution of basic alkali metal azide is continuously removed through line 26 for further processing.

The following Examples are intended to illustrate but not to limit the improved separation process of the invention.

EXAMPLE 1

351.2 g. of liquid anhydrous ammonia and 66 g. of basic sodium azide were added to a pressure vessel. The mixture was momentarily stirred to suspend the basic sodium azide. 250 ml. of mineral oil was then added and the basic azide settled into the oil phase. 200 ml. of water was then added to the vessel bottom and the basic azide settled into the water phase where slight agitation caused dissolution. Three phases were formed with sharp clear interfaces.

EXAMPLE 2

Five parts of crude sodium azide suspended in 100 parts of mineral oil was delivered at a rate of 225 g./min. into a vessel of water. A 20 mesh screen was located just below the position of the liquid interface. The crude azide was dissolved in the water and the oil and water phases did not mix or emulsify.

The mineral oil suitable for use as the oil phase medium must be inert to any chemical reaction with the components of the liquid ammonia/alkali metal azide solution and must have a density greater than this solution. Aliphatic mineral oil is a preferred oil material but other similar oils such as, for example silicone oil may also be employed.

The materials of construction of the vessels and lines of the apparatus will conform to the requirements of a high pressure azide manufacturing process and will avoid the use of any reactive metals. Vessels 8 and 10 as shown in FIG. 1 may, if desired, be made of inert plastic material such as polyethylene.

It may be seen that the improved process of the invention provides an economic and effective method for the separation of the azide phase and the hydroxide phase in a continuous azide manufacturing process which improved process avoids all of the difficulties heretofore experienced in the use of centrifuging or filtration methods.

What we claim is:

1. An improved process for the separation of basic alkali metal azide particles suspended in an alkali metal azide/liquid ammonia solution comprising the steps of bringing said suspension of basic alkali metal azide particles into contact with a non-reactive, immiscible mineral oil of density greater than the density of said solution, permitting said mineral oil and said solution to separate to form an interface whereby said suspended basic alkali metal azide particles traverse said interface and enter into suspension in the said mineral oil, separating said liquid ammonia/azide solution and said basic azide-containing mineral oil, and recovering from said mineral oil the said basic alkali metal azide particles.

2. An improved process as claimed in claim 1 also comprising the additional steps of bringing said basic azide-containing mineral oil into contact with water to form an interface and allowing the said basic azide particles to traverse the said interface and enter into solution in the water.

3. A process as claimed in claim 2 wherein a screening means having openings therein corresponding to the mean particle size of the said suspended basic alkali metal azide particles is interposed at the said oil/water interface.

4. A process as claimed in claim 1, which is a continuous process.

5. A process as claimed in claim 1, wherein said immiscible mineral oil is selected from aliphatic mineral oils and silicone oil.

* * * * *